(12) United States Patent
Leconte

(10) Patent No.: US 10,692,318 B2
(45) Date of Patent: Jun. 23, 2020

(54) METHOD FOR ESTIMATING A DISTANCE AND ELECTRONIC UNIT FOR A VEHICLE

(71) Applicant: VALEO COMFORT AND DRIVING ASSISTANCE, Créteil (FR)

(72) Inventor: Eric Leconte, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 15/769,188

(22) PCT Filed: Oct. 17, 2016

(86) PCT No.: PCT/EP2016/074908
§ 371 (c)(1),
(2) Date: Sep. 20, 2018

(87) PCT Pub. No.: WO2017/067892
PCT Pub. Date: Apr. 27, 2017

(65) Prior Publication Data
US 2019/0005753 A1    Jan. 3, 2019

(30) Foreign Application Priority Data

Oct. 19, 2015 (FR) ..................................... 15 59960

(51) Int. Cl.
*G07C 9/00* (2020.01)
*B60R 25/24* (2013.01)
(Continued)

(52) U.S. Cl.
CPC ........ *G07C 9/00309* (2013.01); *B60R 25/241* (2013.01); *B60R 25/245* (2013.01);
(Continued)

(58) Field of Classification Search
CPC ...... G07C 9/00309; G07C 2009/00325; G07C 2009/00555; G07C 2009/00793;
(Continued)

(56) References Cited

U.S. PATENT DOCUMENTS

| | | | | |
|---|---|---|---|---|
| 5,220,332 A | * | 6/1993 | Beckner | .................. G01S 11/02 342/125 |
| 2003/0090365 A1 | * | 5/2003 | Bergerhoff | .............. B60R 25/20 340/5.61 |

(Continued)

FOREIGN PATENT DOCUMENTS

| | | |
|---|---|---|
| EP | 0 999 103 A2 | 5/2000 |
| WO | 00/06858 A1 | 2/2000 |

(Continued)

OTHER PUBLICATIONS

International Search Report issued in PCT/EP2016/074908 dated Dec. 15, 2016 (3 pages).
Written Opinion of the International Searching Authority issued in PCT/EP2016/074908 dated Dec. 15, 2016 (7 pages).

*Primary Examiner* — Thomas D Alunkal
(74) *Attorney, Agent, or Firm* — Osha Liang LLP

(57) ABSTRACT

The invention relates to a method for estimating a distance (d) between a vehicle (10) fitted with a first wireless communication module (12) and an identifier (20) fitted with a second wireless communication module (22), including the following steps: generating a randomly ordered list; receiving, by at least one of the first and second wireless communication modules (12, 22), electromagnetic signals having a frequency that changes consecutively from among a plurality of frequencies in accordance with said list; for each frequency in the plurality of frequencies, measuring a reception phase of the electromagnetic signal having the relevant (Continued)

Figure 1:
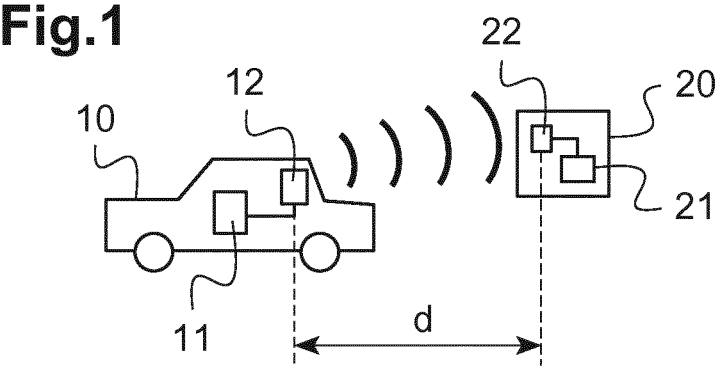

frequency; estimating said distance (d) on the basis of the measured phases. An electronic unit (11) for a vehicle (10) is also described.

10 Claims, 2 Drawing Sheets

(51) Int. Cl.
*G01S 13/84* (2006.01)
*G01S 11/02* (2010.01)

(52) U.S. Cl.
CPC ............... *G01S 11/02* (2013.01); *G01S 13/84* (2013.01); *G07C 2009/00325* (2013.01); *G07C 2009/00555* (2013.01); *G07C 2009/00793* (2013.01); *G07C 2209/61* (2013.01)

(58) Field of Classification Search
CPC . G07C 2209/61; B60R 25/241; B60R 25/245; G01S 11/02; G01S 13/84
See application file for complete search history.

(56) References Cited

U.S. PATENT DOCUMENTS

| | | | |
|---|---|---|---|
| 2005/0099333 A1* | 5/2005 | Gila | G01S 13/348 342/118 |
| 2006/0083406 A1* | 4/2006 | Ishimura | B60R 25/24 382/106 |
| 2010/0117868 A1* | 5/2010 | Van Wiemeersch | G07C 5/008 340/989 |
| 2014/0327517 A1* | 11/2014 | Portet | G01S 13/84 340/5.61 |
| 2014/0340193 A1* | 11/2014 | Zivkovic | G07C 9/28 340/5.61 |

FOREIGN PATENT DOCUMENTS

| | | |
|---|---|---|
| WO | 03/060835 A2 | 7/2003 |
| WO | 2007/128319 A2 | 11/2007 |
| WO | 2012/114320 A1 | 8/2012 |

* cited by examiner

METHOD FOR ESTIMATING A DISTANCE AND ELECTRONIC UNIT FOR A VEHICLE

TECHNICAL FIELD OF THE INVENTION

The present invention relates to estimating a distance between an identifier and a vehicle.

The invention more particularly relates to a method for estimating a distance and to an electronic unit for a vehicle.

The invention is particularly advantageously applicable to the case in which it is desired to protect the vehicle from relay attacks.

TECHNOLOGICAL BACKGROUND

PEPS (passive entry/passive start) systems are known in which the implementation of a function (such as unlocking the doors of a vehicle or starting such a vehicle) is conditional upon the presence of an identifier (generally carried by the user of the vehicle) in proximity to the vehicle.

Document US 2003/090 365 proposes measuring phases of reception of electromagnetic signals exchanged between the identifier and the vehicle for two different frequencies of the electromagnetic signals.

The distance separating the identifier and the vehicle may then be estimated on the basis of the difference between the measured phases.

SUBJECT MATTER OF THE INVENTION

In this context, the present invention provides a method for estimating a distance separating a vehicle provided with a first wireless communication module and an identifier provided with a second wireless communication module, comprising the following steps:
- generating a randomly ordered list;
- receiving, by at least one of the first and second wireless communication modules, electromagnetic signals having a frequency varying successively between a plurality of frequencies according to said list (in the order indicated in this list);
- for each frequency from the plurality of frequencies, measuring a phase of reception of the electromagnetic signal having the frequency in question;
- estimating said distance on the basis of the measured phases.

The frequency of the electromagnetic signals used to estimate the distance thus varies unpredictably and a relay attack such as described below with reference to FIG. 3 will therefore be ineffective.

According to features that are optional, and therefore nonlimiting:
- the method comprises a step of transmitting descriptive data of the list between the first wireless communication module and the second wireless communication module;
- the method comprises a step of encrypting the descriptive data of the list;
- the descriptive data of the list are transmitted under encryption between the first wireless communication module and the second wireless communication module;
- the method comprises a step of transmitting, by the other of the first and second wireless communication modules, said electromagnetic signals having a frequency varying successively between the plurality of frequencies according to said list;
- the step of estimating said distance comprises a step of determining a slope of a regression line linked to points that are each defined by a frequency from the plurality of frequencies and the associated measured phase;
- the reception step is implemented by the first wireless communication module.

The estimation method may further comprise one or more of the following steps:
- transmitting, by the first wireless communication module, electromagnetic signals having a frequency varying successively between the plurality of frequencies;
- receiving, by the second wireless communication module, electromagnetic signals having a frequency varying successively between the plurality of frequencies;
- for each frequency from the plurality of frequencies, measuring, at the second wireless communication module, a second phase of a received electromagnetic signal having the frequency in question;
- transmitting the second measured phases from the second wireless communication module to the first wireless communication module.

The transmitted second phases may then be used in the step of estimating said distance.

The aforementioned method may further comprise a step of potentially implementing a function of the vehicle according to the estimated distance.

The invention also provides an electronic unit for a vehicle, comprising:
- an element designed to generate a randomly ordered list;
- an element designed to control the reception (by a wireless communication module fitted to the vehicle), from an identifier, of electromagnetic signals having a frequency varying successively between a plurality of frequencies according to said list;
- an element designed to measure, for each frequency from the plurality of frequencies, a phase of reception of the electromagnetic signal having the frequency in question;
- an element designed to estimate a distance separating the vehicle and the identifier on the basis of the measured phases.

Such an electronic unit may also have at least one of the optional features presented above for the method.

When the electronic unit is produced on the basis of a microprocessor and at least one memory (such as described below), at least some of the aforementioned elements may be implemented by means of instructions stored in said memory and designed to carry out the function of the element in question when these instructions are run by the microprocessor.

DETAILED DESCRIPTION OF ONE EXEMPLARY EMBODIMENT

The following description with reference to the appended drawings, which are provided as nonlimiting examples, will facilitate understanding of the invention and how it may be carried out.

Figure 2:
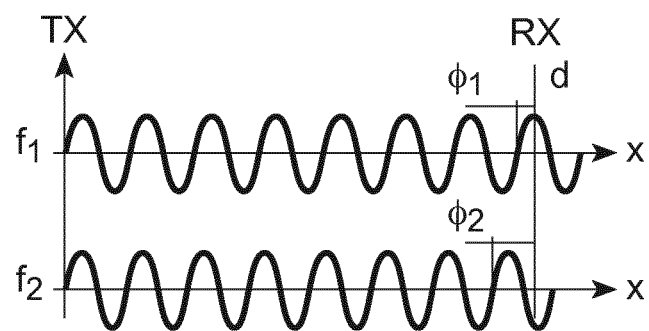
Figure 3:
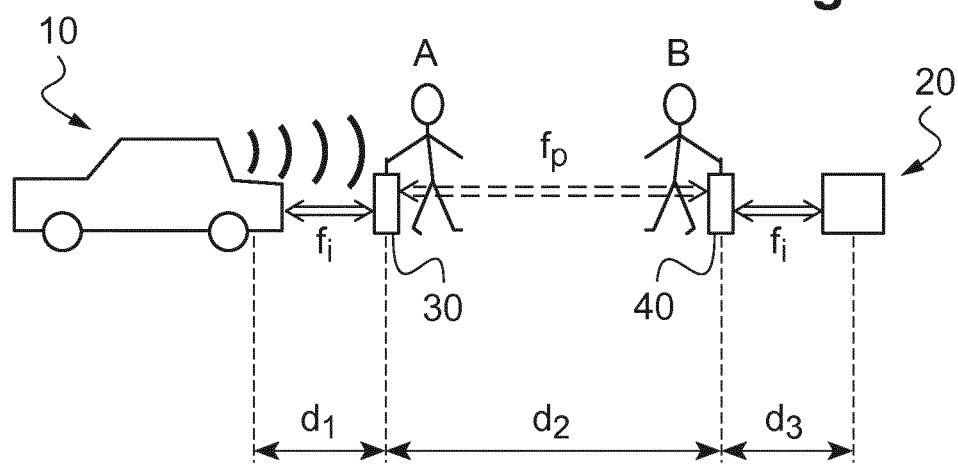
Figure 4:
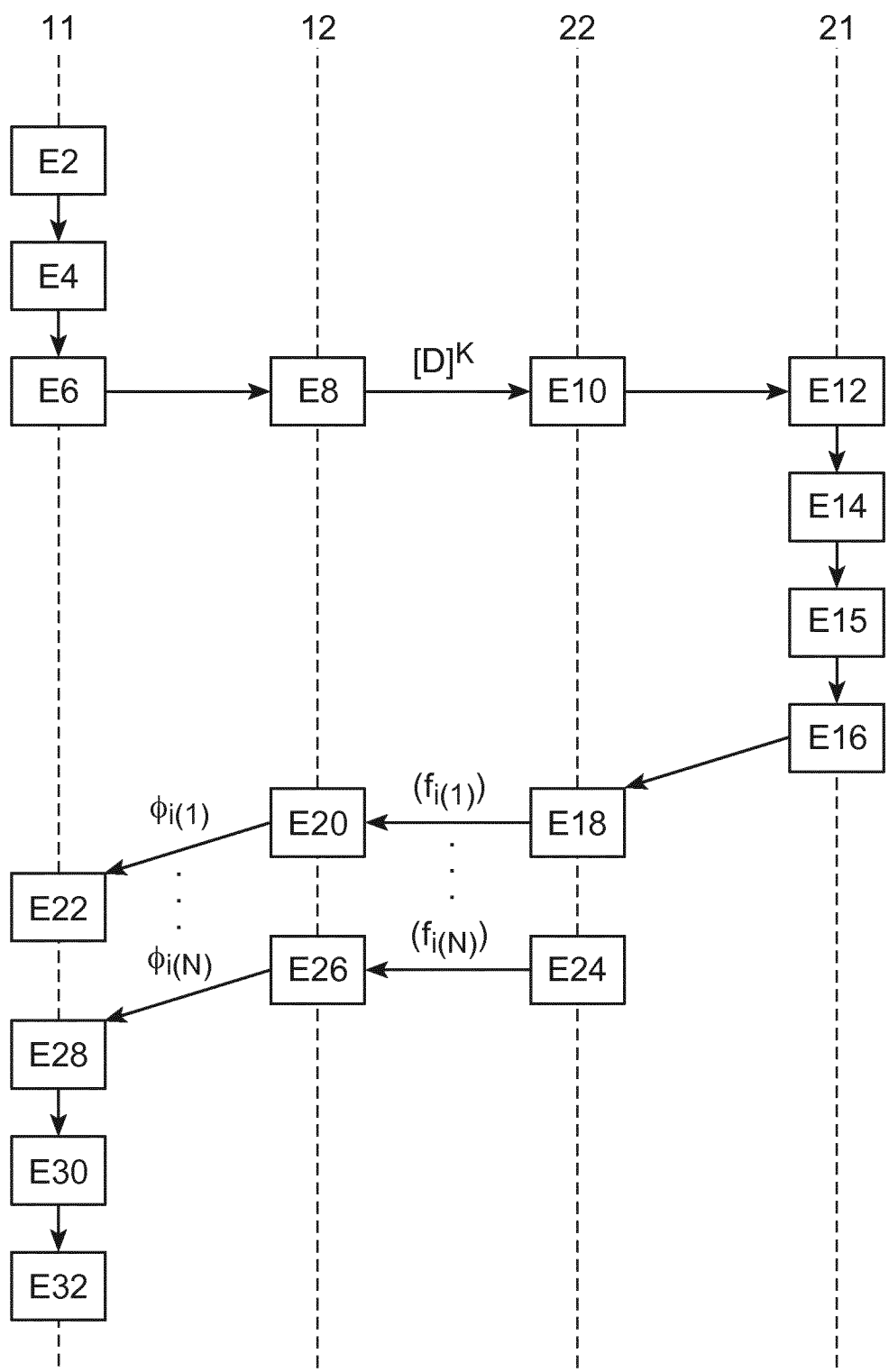

In the appended drawings:

FIG. 1 schematically shows the main elements of a system in which the invention is able to be implemented;

FIG. 2 schematically shows the propagation of two signals having frequencies that differ from one another;

FIG. 3 shows a possible relay attack on a system of the type of that of FIG. 1; and FIG. 4 is a flow chart showing a method for estimating the distance separating an identifier and a vehicle.

FIG. 1 schematically shows the main elements of a system in which the invention is able to be implemented.

Such a system comprises a vehicle 10, here an automotive vehicle, and an identifier 20, for example a key or badge for accessing the vehicle 10 (or, as a variant, a user terminal, such as a mobile telephone or a smartphone, provided with access rights to the vehicle 10).

The vehicle 10 is provided with an electronic control unit 11 and with a communication module 12.

The electronic control unit 11 comprises, for example, a microprocessor and at least one memory, for example a rewritable non-volatile memory. The memory stores, in particular, program instructions that allow, when they are run by the microprocessor, the electronic control unit 11 to implement the methods described below. The memory also stores values or parameters used in these methods, for example measured phase cl values (as explained below).

The memory of the electronic control unit 11 additionally stores a cryptographic key K (which has for example been written into the electronic control unit 11 during the manufacture thereof).

As a variant, the electronic control unit 11 could be embodied in the form of an application-specific integrated circuit (or ASIC).

The communication module 12 is designed to establish a wireless link with other electronic devices, in this case a link of Bluetooth Low Energy (or BLE) type. The communication module 12 is therefore in particular designed to transmit and receive electromagnetic signals (typically with a frequency higher than 1 MHz, or even 500 MHz), in this case in the 2.4 GHz band.

The identifier 20 is generally carried by a user of the vehicle 10, and makes it possible to control certain functions of the vehicle 10 (for example unlocking the doors of the vehicle 10), in particular when it is brought close to the vehicle 10. The identifier 20 may potentially further include control buttons, by way of which the user is able to control at least some of the aforementioned functions or other functions of the vehicle 10.

The identifier 20 comprises a control unit 21 and a communication module 22.

The control unit 21 is, for example, embodied by means of a microprocessor and at least one memory, for example a rewritable non-volatile memory. The memory stores, in particular, program instructions that allow, when they are run by the microprocessor, the control unit 21 to implement the methods described below. The memory also stores values or parameters used in these methods.

The memory of the control unit 21 also additionally stores the cryptographic key K. In the case in which the identifier 20 is a badge (or key) for accessing the vehicle, the cryptographic key K has for example been written into the memory of the control unit 21 during the manufacture of the identifier 20. In the variant mentioned above in which the identifier 20 is a user terminal, the cryptographic key K has for example been received from a remote server and stored during a phase of registration for a service for controlling vehicle functions by means of the user terminal.

As a variant, the control unit 21 could be embodied in the form of an application-specific integrated circuit.

The communication module 22 is designed to establish a wireless link (in this case of Bluetooth Low Energy or BLE type) with other electronic devices, in particular with the electronic control unit 11 of the vehicle 10 via the communication module 12 mentioned above. The communication module 22 is therefore also designed to transmit and receive electromagnetic signals (typically with a frequency higher than 1 MHz, or even 500 MHz), in this case in the 2.4 GHz band.

By virtue of the wireless link thus established between the communication module 12 of the vehicle 10 and the communication module 22 of the identifier 20, data are able to be exchanged between the electronic control unit 11 of the vehicle 10 and the control unit 21 of the identifier 20, as explained below.

The electromagnetic signals exchanged between the communication modules 12, 22 may additionally be used to evaluate the distance d separating the identifier 20 and the vehicle 10, on the basis of the principle now explained with reference to FIG. 2.

Specifically, FIG. 2 schematically shows the propagation of two signals having respective frequencies $f_1$, $f_2$ (which differ from one another) between a transmitter module TX and a receiver module RX (and along an axis Ox passing through these two modules).

Measuring the phase $\phi_i$ of each of these signals at the receiver RX makes it possible to deduce the distance d separating the transmitter module TX and the receiver module RX according to the formula:

$$d = c \cdot (\phi_2 - \phi_1) / [2\pi \cdot (f_2 - f_1)],$$

where c is the speed of the electromagnetic waves.

It is possible to take such phase $\phi_i$ measurements for more than two signals having distinct frequencies $f_i$, which makes it possible to overcome the reflection or refraction phenomena that are liable to occur at certain frequencies.

FIG. 3 illustrates how a system operating on such a principle could be subject to an advanced relay attack.

A first attacker A is located in proximity to the vehicle 10 (specifically at a distance $d_1$ from the vehicle 10) and carries a first electronic module 30 which receives the signal transmitted by the vehicle 10 at a frequency $f_i$ (it is assumed here that the transmitter module TX is the communication module 12 of the vehicle 10).

The first electronic module 30 modulates the received signal by means of a carrier of frequency $f_P$ and transmits the obtained modulated signal to a second electronic module 40 carried by an attacker B located in proximity to the identifier 20.

As can be seen in FIG. 3, the electronic modules 30, 40 are separated by a distance $d_2$, while the second electronic module 40 is at a distance $d_3$ from the identifier 20.

The second electronic module 40 demodulates the signal that it receives and hence obtains the signal of frequency $f_i$, which it transmits to the identifier 20.

The value of the phase φ corresponding to the propagation of the electromagnetic signals from the vehicle 10 to the identifier 20 via the attackers A, B is:

$$\varphi = 2\pi \cdot (f_P - f_i) \cdot d_2 / c + 2\pi \cdot f_i \cdot (d_1 + d_3) / c$$

Consequently, if the attackers know the successive frequencies of transmission $f_i$ and design the electronic modules 30, 40 so that the quantity $(f_P - f_i)$ is constant (i.e. that the frequency $f_P$ of the carrier is modified for each transmission frequency $f_i$ so as to have: $f_P - f_i =$ cte), the attack will go unnoticed since the distance estimate proposed above gives in this case:

$$d = c \cdot [\varphi(f_2) - \varphi(f_1)] / [2\pi \cdot (f_2 - f_1)] = d_1 + d_3.$$

Stated otherwise, since the quantity $(f_P - f_i)$ is constant, the term $2\pi \cdot (f_P - f_i) \cdot d_2 / c$ is also constant from one measurement to the next and is cancelled out when differencing between the measured phases $\varphi(f_2)$, $\varphi(f_1)$.

A method for estimating the distance d which is not subject to such an attack is now described with reference to FIG. 4.

This method begins with step E2, in which the electronic control unit 11 of the vehicle 10 generates a list of randomly ordered frequencies $f_i$.

In practice, the electronic control unit 11 stores for example a set of predefined frequencies $f_1, f_2, \ldots, f_N$ (where N is for example comprised between 50 and 100) and generates, by random sampling, an ordered list of indices $i(1), i(2), \ldots, i(N)$: the list of randomly ordered frequencies is then $f_{i(1)}, f_{i(2)}, \ldots, f_{i(N)}$.

The electronic control unit 11 then encrypts, in a step E4, descriptive data D of the ordered list by means of a cryptographic encryption algorithm using the cryptographic key K.

The descriptive data D of the ordered list represent for example the successive values of the frequencies $f_i$, in the order given by the ordered list generated in step E2. In the example given above, the descriptive data D of the ordered list may, as a variant, represent the list of indices $i(1), i(2), \ldots, i(N)$.

The electronic control unit 11 then orders the communication module 12 to transmit the encrypted descriptive data $[D]^K$ (step E6).

The communication module 12 thus transmits (step E8) the encrypted descriptive data $[D]^K$ via the wireless link established between the communication module 12 of the vehicle 10 and the communication module 22 of the identifier 20.

It should be noted that it is possible to envisage, when establishing the wireless link or after the establishment thereof, a process of authenticating the identifier 20 by the electronic control unit 11 of the vehicle 10, for example by checking (potentially by means of a challenge-response protocol) that the identifier 20 does indeed hold access rights to the vehicle 10 (i.e. in practice that the identifier 20 stores a given cryptographic key, for example the aforementioned cryptographic key K).

The communication module 22 of the identifier 20 receives the encrypted descriptive data $[D]^K$ in step E10 and transmits these data $[D]^K$ to the control unit 21 (step E12).

The control unit 21 may thus decrypt, in step E14, the encrypted descriptive data $[D]^K$ by means of a decryption algorithm using the cryptographic key K (stored as already mentioned in the control unit 21).

As mentioned above, the use of a symmetric key encryption system is proposed in the example described here. However, as a variant, it would be possible to use an encryption system in which the encryption key and the decryption key are different, for example a system using a public key (used for encryption) and a private key (used for decryption).

The control unit 21 is thus able to store, in step E15, the list of randomly ordered frequencies indicated by the descriptive data D. In the exemplary implementation described above, it is possible to envisage the control unit 21 storing the set of predefined frequencies $f_1, f_2, \ldots, f_N$ (which is identical to that stored in the electronic control unit 11) and the control unit 21 then storing in practice, in step E15, the ordered list of indices $i(1), i(2), \ldots, i(N)$ defined by the descriptive data.

In the example described here, the ordered list of frequencies is generated randomly at the vehicle 10 (specifically by the electronic control unit 11) and transmitted to the identifier 20 so that knowledge of this list is shared by these two entities. It is possible to envisage, as a variant, this ordered list of frequencies being generated at the identifier 20 and transmitted, for example in encrypted form, to the vehicle 10, which also allows knowledge of the list to be shared.

The control unit 21 of the identifier 20 then orders (step E16) the communication module 22 to transmit electromagnetic signals successively having the frequencies $f_i$ listed in the ordered list of frequencies.

For example, step E18 of FIG. 4 shows an electromagnetic signal having a frequency $f_{i(1)}$ being transmitted by the communication module 22 of the identifier 20.

This electromagnetic signal having a frequency $f_{i(1)}$ is received by the communication module 12 of the vehicle 10 in step E20, which makes it possible to obtain a measurement of the phase $\phi_{i(1)}$ of the received electromagnetic signal. Reference may be made in this regard to document U.S. Pat. No. 5,220,332.

The measured phase $\phi_{i(1)}$ is received by the electronic control unit 11 and stored in step E22.

Steps similar to steps E18 to E22 are carried out for each of the frequencies in the ordered frequency list, in the order established by this list.

FIG. 4 also shows the transmission, by the communication module 22, of an electromagnetic signal having a frequency $f_{i(N)}$ (last frequency in the ordered list in the described example) in step E24.

This electromagnetic signal having a frequency $f_{i(N)}$ is received by the communication module 12 of the vehicle 10 in step E26, which makes it possible to obtain a measurement of the phase $\phi_{i(N)}$ of the received electromagnetic signal.

The measured phase $\phi_{i(N)}$ is received by the electronic control unit 11 and stored in step E28.

The electronic control unit 11 thus stores the measured phases $\phi_i$ for a plurality of frequencies $f_i$ (regardless of the order in which these measurements have been taken) and may deduce therefrom in step E30 an estimate of the distance d separating the identifier 20 and the vehicle 10.

For example, by accounting for the fact that the various points of coordinates $(f_i, \phi_i)$ are in theory located on a straight line having a slope $c/(2\pi \cdot d)$ according to the distance estimation principle recalled with reference to FIG. 2, step E30 comprises for example determining the slope of a regression line linked to the points of coordinates $(f_i, \phi_i)$ and determining the estimated distance according to this slope.

The electronic control unit 11 of the vehicle 10 may then potentially control, in step E32, a function of the vehicle 10 according to the estimated distance. For example, the electronic control unit 11 may control the unlocking of the doors of the vehicle 10 if the estimated distance is below a predetermined threshold.

In the example described above, the electromagnetic signals (successively having the frequencies $f_i$ in the order indicated in the ordered list of frequencies) are transmitted by the communication module 22 of the identifier 20.

As a variant, these electromagnetic signals could be transmitted by the communication module 12 of the vehicle 10; the reception phases $\phi_i$ would then be measured at the communication module 22. The measured phases $\phi_i$ associated with each frequency $f_i$ could then be transmitted (via the wireless link established between the communication modules 12, 22, potentially in encrypted form) to the electronic control unit 11 for estimating the distance d (as in step E30 described above); the measured phases $\phi_i$ could also be used within the identifier 20 to estimate the distance d (according to the principle recalled above), in which case the distance d estimated within the identifier 20 is transmitted to the electronic control unit 11 via the wireless link established between the communication modules 12, 22 (potentially in encrypted form).

According to yet another variant, electromagnetic signals successively having the frequencies $f_i$ (in the order indicated by the randomly ordered list) are transmitted by the communication module 22 of the identifier 20 and a phase $\phi_i$ measurement is taken at the vehicle 10 as described above with reference to FIG. 4. Furthermore, electromagnetic signals successively having the frequencies $f_i$ (in the order indicated by the randomly ordered list, or in another randomly defined order as explained above) are transmitted by the communication module 12 of the vehicle 10 and a phase $\phi'_i$ measurement is taken at the identifier 20.

The phase $\phi'_i$ values measured at the identifier 20 are transmitted to the electronic control unit 11 via the wireless link established between the communication modules 12, 22.

According to this variant, the electronic control unit 11 determines, for each frequency $f_i$, the sum of the corresponding phase $\phi_i$ measured at the vehicle 10 and of the corresponding phase $\phi'_i$ measured at the identifier 20, and estimates the distance d separating the identifier 20 and the vehicle 10 on the basis of these sums (which are each associated with a frequency $f_i$).

Such sums effectively corresponds to a return journey of the electromagnetic signal, i.e. to a distance equal to 2·d, and make it possible to overcome the difference in phase reference which may exist between the two communication modules 12, 22, as explained for example in document U.S. Pat. No. 5,220,332.

Specifically, the process of exchanging the signals and measuring the reception phases is then as follows for a given frequency f:

transmitting, by a first module (for example the communication module 12), an electromagnetic signal having this given frequency f with a reference phase $\phi_{ref}$;

receiving the signal by the second module (here the communication module 22) with an (absolute) phase $\phi'_{abs} = \phi_{ref} + 2*\pi*d*f/c$;

measuring this phase by the second module using its own reference phase $\phi'_{ref}$, the value of the measured phase therefore being:

$$\phi' = \phi'_{abs} - \phi'_{ref} = \phi_{ref} + 2*\pi*d*f/c - \phi'_{ref};$$

transmitting, by the second module, an electromagnetic signal having this same given frequency f with its own reference phase $\phi'_{ref}$;

receiving, by the first module, this electromagnetic signal with an (absolute) phase $\phi_{abs} = \phi'_{ref} + 2*\pi*d*f/c$;

measuring this phase by the first module using its reference phase $\phi'_{ref}$, which gives a measured phase:

$$\phi = \phi_{abs} - \phi_{ref} = \phi'_{ref} + 2*\pi*d*f/c - \phi_{ref}.$$

The value of the sum $(\phi+\phi')$ of the measured phases is: $2*(2*\pi)*d*f/c$ and the phase offset between the two modules 12, 22 is thus overcome.

In another possible embodiment, the reception of measured phases, the calculation of the aforementioned sums and the estimation of the distance on the basis of these sums could be carried out by the control unit 21 of the identifier 20 (the estimated distance could then potentially be transmitted from the control unit 21 to the electronic control unit 11 of the vehicle 10 via the established wireless link).

In all cases, the order in which the various frequencies $f_i$ are used for the transmitted signals is random so that an attacker will not be able to predict this order and match the frequency of the carrier $f_p$ to the frequency $f_i$ of the transmitted signal (as explained above with reference to FIG. 3). The attackers will therefore not be able to implement the attack described above with reference to FIG. 3.

The invention claimed is:

1. A method for estimating a distance separating a vehicle provided with a first wireless communication module and an identifier provided with a second wireless communication module, comprising:
    generating a randomly ordered list;
    receiving, by at least one of the first and second wireless communication modules, electromagnetic signals having a frequency varying successively between a plurality of frequencies according to said list;
    for each frequency from the plurality of frequencies, measuring a phase of reception of the electromagnetic signal having the frequency in question; and
    estimating said distance on the basis of the measured phases.

2. The estimation method as claimed in claim 1, further comprising transmitting descriptive data of the list between the first wireless communication module and the second wireless communication module.

3. The estimation method as claimed in claim 2, further comprising encrypting the descriptive data of the list, wherein the descriptive data of the list are transmitted under encryption between the first wireless communication module and the second wireless communication module.

4. The estimation method as claimed in claim 1, further comprising transmitting, by the other of the first and second wireless communication modules, said electromagnetic signals having a frequency varying successively between the plurality of frequencies according to said list.

5. The estimation method as claimed in claim 1, wherein estimating said distance comprises determining a slope of a regression line linked to points that are each defined by a frequency from the plurality of frequencies and the associated measured phase.

6. The estimation method as claimed in claim 1, wherein receiving the electromagnetic signals is implemented by the first wireless communication module.

7. The estimation method as claimed in claim 6, further comprising:
    for each frequency from the plurality of frequencies, measuring, at the second wireless communication module, a second phase of a received electromagnetic signal having the frequency in question; and
    transmitting the second measured phases from the second wireless communication module to the first wireless communication module.

8. The estimation method as claimed in claim 7, wherein the transmitted second phases are used in estimating said distance.

9. The estimation method as claimed in claim 1, further comprising potentially implementing a function of the vehicle according to the estimated distance.

10. An electronic unit for a vehicle, comprising:
    an element for generating a randomly ordered list;
    an element for controlling the reception, from an identifier, of electromagnetic signals having a frequency varying successively between a plurality of frequencies according to said list;
    an element for measuring, for each frequency from the plurality of frequencies, a phase of reception of the electromagnetic signal having the frequency in question; and an element for estimating a distance separating the vehicle and the identifier on the basis of the measured phases.

* * * * *